United States Patent [19]

Hong et al.

[11] Patent Number: 5,664,203
[45] Date of Patent: Sep. 2, 1997

[54] PERIPHERAL DEVICE INPUT-INITIATED RESUME SYSTEM FOR COMBINED HIBERNATION SYSTEM AND BACK-UP POWER SUPPLY FOR COMPUTER

[75] Inventors: Jeong-Woo Hong, Seoul; Hee-Duck Park; Shung-hyun Cho, both of Suwon; Noh-Byung Park, Seoul, all of Rep. of Korea

[73] Assignee: Samsung Electronics Co., Ltd., Suwon, Rep. of Korea

[21] Appl. No.: 576,343

[22] Filed: Dec. 21, 1995

[30] Foreign Application Priority Data

Dec. 22, 1994 [KR] Rep. of Korea ............... 94-35953

[51] Int. Cl.[6] ......................... G06F 1/26; G06F 1/32
[52] U.S. Cl. ..................... 395/750.05; 395/182.12; 395/182.2; 395/750.01; 364/707; 364/492; 307/66
[58] Field of Search ................ 395/750, 182.12, 395/182.2, 182.13, 182.21, 182.22; 364/707, 492; 307/66; 365/226, 227, 229

[56] References Cited

U.S. PATENT DOCUMENTS

| 4,747,041 | 5/1988 | Engle et al. | 395/750 |
|---|---|---|---|
| 5,151,907 | 9/1992 | Robbins | 395/182.2 |
| 5,167,024 | 11/1992 | Smith et al. | 395/375 |
| 5,193,176 | 3/1993 | Brandin | 395/182.12 |
| 5,239,652 | 8/1993 | Seibert et al. | 395/750 |
| 5,339,426 | 8/1994 | Aoshima | 395/700 |
| 5,375,230 | 12/1994 | Fujimori | 395/750 |
| 5,430,867 | 7/1995 | Gunji | 395/188.01 |
| 5,446,906 | 8/1995 | Kardach et al. | 395/750 |
| 5,450,003 | 9/1995 | Cheon | 323/272 |
| 5,486,726 | 1/1996 | Kim et al. | 307/120 |
| 5,493,684 | 2/1996 | Gephardt et al. | 395/750 |
| 5,530,877 | 6/1996 | Hanaoka | 395/750 |
| 5,537,656 | 7/1996 | Mozdzen et al. | 395/750 |
| 5,539,400 | 7/1996 | Mears | 341/22 |
| 5,548,764 | 8/1996 | Duley et al. | 395/750 |

*Primary Examiner*—Gopal C. Ray
*Attorney, Agent, or Firm*—Cushman Darby & Cushman, IP Group of Pillsbury Madison & Sutro LLP

[57] ABSTRACT

A peripheral device input-initiated resume system for a combined hibernation system and back-up power supply for a computer comprises a keyboard controller for inputting an appropriate signal to the operating condition based on the key selected by a user, a power management system for outputting a wake-up signal if the signal is inputted from the keyboard or other input devices, a data back-up power unit for supplying DC voltage in case the power is cut-off suddenly or a user does not use the computer for a predetermined time, a power supplying unit in which a switching-mode power supply SMPS converts the external source AC power at line voltage into DC power at a desired voltage and supplies that power to each device on the main board of the computer, thereby retrieving the previous work again by cutting off power of all devices, once the power is off or when a user does not use the computer for a predetermined time, and supplying the additional power only to the MICOM(Micro Computer) or keyboard controller in the state that a hibernation mode is performed. Then the system repeats supplying power if a signal is input again by a user, and consequently helps a user to use the computer more easily with this hibernation state by retrieving the work to the previous state.

7 Claims, 2 Drawing Sheets

5,664,203

PERIPHERAL DEVICE INPUT-INITIATED RESUME SYSTEM FOR COMBINED HIBERNATION SYSTEM AND BACK-UP POWER SUPPLY FOR COMPUTER

BACKGROUND OF THE INVENTION (1) Field of Invention

The present invention relates to a hibernation system for a computer, in which the previous operating condition is initiated by input from a peripheral device such as a keyboard. Particularly, in a hibernation system which cuts off power automatically when one does not use the computer for a period of predetermined duration, the present invention relates to a power control device which can retrieve the operating environment to the previous state by supplying the power again if a key-signal input by a user or a signal from a modem or other peripheral device is input.

(2) Description of Prior Art

With the progression of computer functionality, and in consideration of energy conservation, power-saving functions of computers have been improved so as to include hibernation systems.

A desirable hibernation system includes a function that in case electrical power is cut off through either sudden power failure or a mistake made by a user, the computer stores the present operation condition in an auxiliary storage unit such as a hard disk and once power is on again, restores the computer's memory to the pre-power-off state. Another desirable function is that in case a user does not use the computer for a predetermined time when the computer is in a power-on state, the hibernation system cuts off the power automatically while storing the present operating condition in the auxiliary storage unit. Electrical power is economized, until work is resumed by retrieving to the computer's memory the operating condition stored in the auxiliary storage unit to that of the pre-power-off state when the user turns on the power again.

Among conventional personal computers, hibernation systems equipped with automatic retrieving functions for emergency or power saving use are increasingly popular.

Korean Patent Application No. 93-3116, filed on Mar. 4, 1993 relates to a power supply control system for peripheral equipment of a computer, and Korean Patent Application No. 92-14590, filed on Aug. 13, 1992 relates to a power cut off generating circuit for peripheral equipment of a computer.

However, these prior hibernation systems reduce a power-supply to below certain voltages when the computer receives no input from a user for a predetermined time. Therefore, the user must turn-on power the switch twice to supply electrical power again and retrieve their work to its previous condition. This creates an inconvenience in operating the computer.

SUMMARY OF THE INVENTION

A principal object of the invention is to provide an improved hibernation system to solve the problems of the prior art. In accordance with the invention, to facilitate retrieving the previous work, this hibernation system cuts off power to the devices when the power fails or is turned off or when a user does not use the computer for a predetermined time. Then it resumes supplying power if a signal is input again from a peripheral device by a user.

To fulfill the above the apparatus of the present invention in its preferred form comprises:

a keyboard controller, which inputs an appropriate signal to the operating condition based on the key selected by a user;

a power management system, which outputs a wake-up signal if the signal is inputted from the keyboard or one of the other input devices;

a data back-up power unit, which supplies DC voltage in case the power is cut-off suddenly or a user does not use the computer for a predetermined time;

a power supplying unit in which a switching-mode power supply SMPS converts the external source AC power at line voltage into DC power at a desired voltage and supplies that power to each device on the main board of the computer. If a power cut-off signal is input, the power supplying unit cuts off the power-supply to the main board simultaneously with supplying to a keyboard controller and the power management system, and outputs the corresponding power cut-off signal.

In order to fulfill the above object, a method of this invention in its preferred form comprises the steps of:

determining if the hibernation interrupt is generated during computer operation;

outputting a signal initiating a hibernation state of a computer system if the interrupt signal is generated when an event does not occur for a predetermined time, and outputting a signal to cut-off power supplied to the main board to a power supplying unit;

determining if the hibernation is ended with the level condition of the read power supplying signal after reading more than one time the power supplying condition signal which is output by the power supplying unit according to the hibernation operation;

resuming the power supply condition by outputting the wake-up signal in case the signal is inputted after determining the signal-input responsive to the data receiving by the key input and modem after the hibernation operation is ended; and ending the operation in case the power supply signal displays the resumption of the power supply on the main board after reading the power condition signal outputted from the power supplying unit.

DETAILED DESCRIPTION OF THE PREFERRED EMBODIMENTS

With the drawings annexed hereto, hereinafter is described the preferred embodiment of the present invention.

Figure 1:
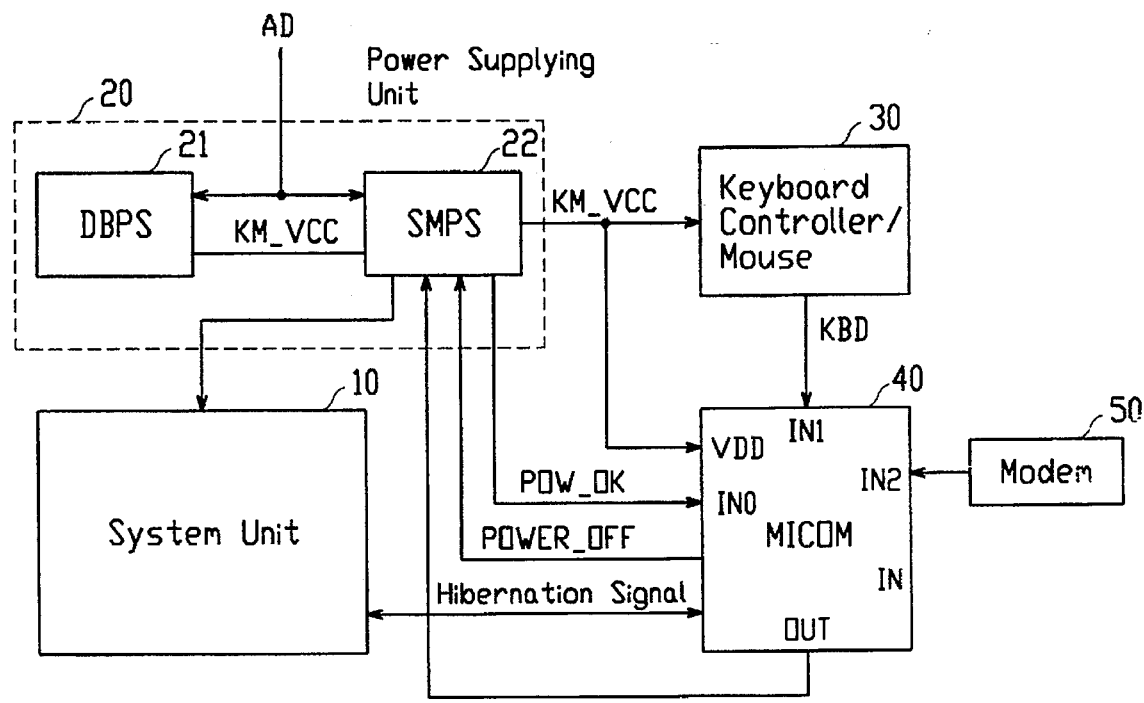
FIG. 1 is a block diagram of a computer having a peripheral device input-initiated resume feature for its combined hibernation system and back-up power supply, according to a preferred embodiment of the invention.
Figure 2:
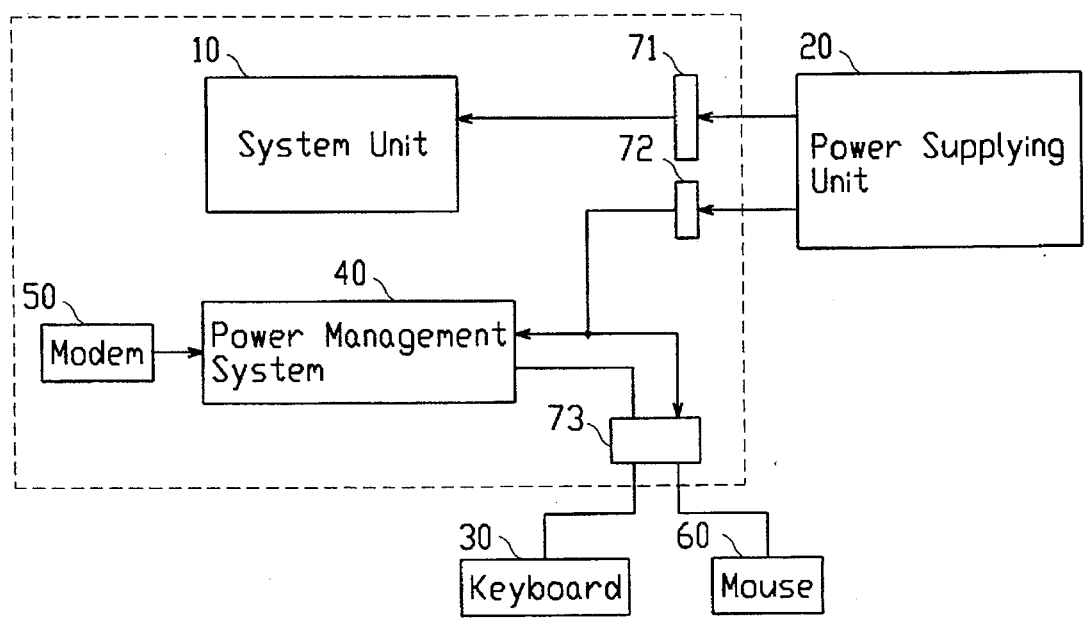
FIG. 2 is a block diagram illustrating the power supply condition of the computer system according to the preferred embodiment of the invention.

As illustrated in FIGS. 1 and 2, a retrievable hibernation system by key-inputting in accordance with the preferred embodiment of the present invention comprises a system unit 10, a power supplying unit 20 which supplies an inputted AC power or battery power to the system unit 10 on the main board, a keyboard controller 30 for outputting appropriate signals due to operating of a keyboard key or keys selected by a user, a modem 50 which is installed in an extended slot in the main board of the computer, and a power management system 40 connected to the output terminal of the keyboard controller, the modem and the power supplying unit.

The power supplying unit 20 further comprises a data backup power unit 21 supplying DC power of the battery in case AC power is cut off and a switching mode power supply 22 supplying the inputted AC power and DC power.

The system unit 10 comprises a central processing unit CPU, a random access memory RAM, a read only memory ROM, a basic input/output system BIOS, a DMA controller, and an auxiliary controller such as an interrupt controller.

The switching mode power supply SMPS 22 supplies the applied external power with converting into a DC power and the DC power outputted from the data backup power unit 21 to every system on the main board.

As illustrated in FIG. 2, the computer system according to the preferred embodiment of the invention comprising the power supplying unit 20, the mother board, and the keyboard controller 30, wherein the power supply 22 converting an AC power into a DC power and a data backup power supply 21 supplying a backup power in case the AC power is not supplied.

The mother board comprises a system unit 10, a power management system 40, a keyboard port 73, a keyboard power terminal 72 and a system power terminal 71. The keyboard controller 30 is constructed to receive power from the keyboard port 73 of the mother board. The power supplying unit 20 supplies power to the keyboard terminal 72 and the system power terminal 71 in case of power saving state, so that the power is supplied only to the power management system 40 and the keyboard port 73.

As illustrated in FIG. 2, the system unit 10, the power management system 40 and the modem 50 are installed in the mother board, the power outputted from the power supplying unit 20 is supplied via the system power terminal 71 to the system unit 10, and a power cut off signal inputted in order to perform a hibernation cuts off the power to the system power terminal 71 and applies the power only through the keyboard power terminal 72 via the keyboard port 73 to the keyboard 30 and the mouse 60.

Figure 3:
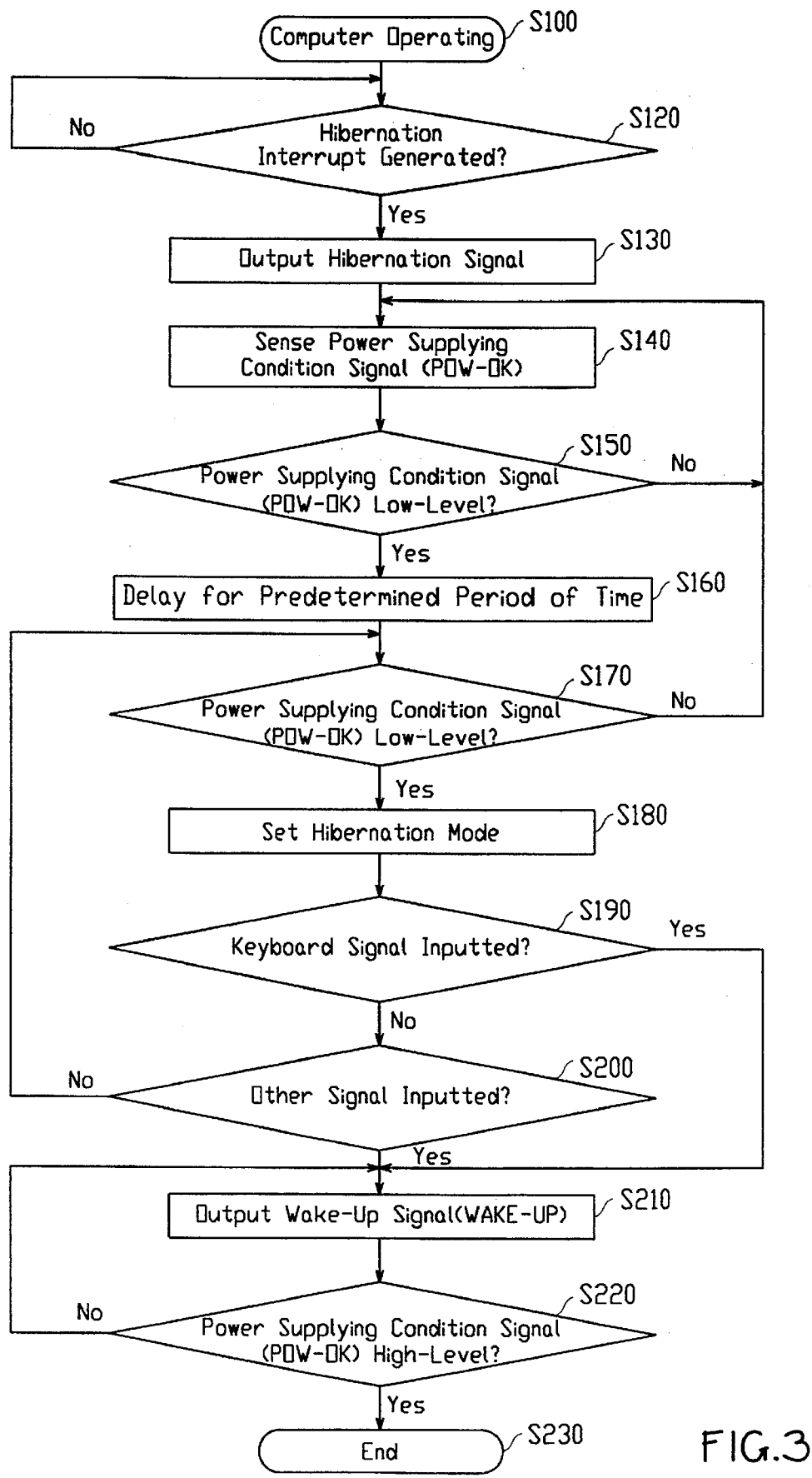
FIG. 3 is an operating flowchart for the system according to the preferred embodiment of the invention.

The functions of the system in accordance with the preferred embodiment of the present invention will be described hereinafter with reference to FIG. 3.

If a user connects the power terminal of the computer to an external power source, i.e.: AC line current, the external power is applied to the power supplying unit 20. The data backup power unit 21 starts charging to supply power needed to backup the data during power-off state. The switching mode power supply 22 converts the AC voltage into DC voltages and supplies the system unit 10 or every system on the main board. As described above, in case of a sudden power-off condition, or in case of no data being input by a user driving working of the computer, the PMS (Power Management System) 40 generates an interrupt or hibernation signal to the system unit 10 (S120–S130). Once the PMS 40 outputs a hibernation signal, the BIOS (Basic Input Output System) in the system unit 10 checks for hibernation setup flag in the non-volatile memory and if a hibernation support mode is not set up, the BIOS ignores the hibernation interrupt signal, and the computer continues working. However, if the hibernation support mode has been set up, in order to perform a suspend process, the BIOS stores the condition of the present PC hardware and all memory data onto the auxiliary storage unit, e.g. a hard disk drive unit in the system unit 10.

The PMS 40 outputs a power cut-off signal to the power supplying unit 20 to cut off the power supplied to the main board and the external power if the hibernation is ended.

The switching mode power supply 23 in the power supplying unit 20 supplies the DC voltages KM-Vcc from the data backup power unit 21 in case of power-off to the keyboard controller 30 and the PMS 40 according to the power cut-off signal POW-OFF, and supplies DC power to the keyboard controller 30 and the PMS 40 after converting the external AC voltages into DC voltages in case of normal state.

The power supplying unit 20 outputs the power supplying condition signal POW-OK displaying the condition of the power supplying to the main board to the PMS 40 when the hibernation is proceeded. The PMS 40 reads the level of the POW-OK and determines if the hibernation is ended (S140–S150).

When the POW-OK is at a low level, the PMS 40 determines firstly that the hibernation is ended, delays the operation for a predetermined period of time and detects the level of the POW-OK again (S160–S170).

When the level of the POW-OK remains low, the PMS senses the hibernation mode and determines if the keyboard signal or other signal is inputted (S180–S200).

The reasons for sensing the level of the POW-OK signal two times more as described above is to enhance the reliability of sensing the signal correctly.

The keyboard controller 30 is operated according to the DC voltage KM-Vcc supplied from the power supplying unit 20 in the hibernation state and outputs the corresponding signal to the PMS 40 if the key-initiated signal by user is inputted. If the signal according to the key-selecting operation is not inputted from the keyboard controller 30, the PMS determines if the signal in accordance with receiving the data is inputted from the modem 50 installed on the motherboard or an additional input device such as the mouse or a device in the extended slot (S200).

In the above step, the PMS 40 determines that a user intends to use the computer again, in case a keyboard signal or a modem signal is input, and performs a resume process and outputs the power supplying signal WAKE-UP to resume the operation by supplying the power to the system unit 10 installed on the main board (S210).

Once the power supplying signal WAKE-UP at a high level, is output from the PMS 40, the power supplying unit 20 cuts off the power output from the data backup power unit 21, supplies the external power to the system unit 10 on the main board and outputs the power supplying condition signal POW-OK at a high level to the PMS 40 to display being resumed from the hibernation state.

The PMS 40, when the power supplying condition signal POW-OK is output at a high level from the power supplying unit 20, performs a hibernation resume mode by outputting the signal to the system unit 10 and loads the memory contents into RAM (Random Access Memory) and retrieves the work environment of the computer to the previous state, i.e. the one which existed immediately prior to hibernation.

In the preferred embodiment of the invention described above, a retrievable hibernation system by key inputting can be provided to retrieve the previous work again by cutting off power of all devices, once the power is off or when a user does not use the computer for a predetermined time, and supplying the additional power only to the MICOM(Micro Computer) or keyboard controller in the state that a hibernation mode is performed. Then the system repeats supplying power if a signal is input again by a user, and consequently helps a user to use the computer more easily with this hibernation state by retrieving the work to the previous state.

What is claimed is:

1. A combined hibernation and back-up power supply system for a computer having a plurality of DC power-using devices, including a CPU and RAM of said computer, in a main board, and a keyboard controller, said system comprising:

a power management system, which generates a hibernation signal when an event is not generated from a peripheral device of said computer or said keyboard controller for a predetermined time, generates a WAKE-UP signal when an input is initiated by said peripheral device or by said keyboard controller, and generates a power cut-off signal when an external power is cut off;

a data backup power unit, which is capable of supplying a DC voltage when said external power is cut off or when said event is not generated from said peripheral device of said computer for said predetermined time;

a power supplying unit coupled to said power management system and said data backup power unit, said power supply unit including a switching mode power supply that converts said external power to said DC voltage and supplies said DC voltage to each of said devices on said main board and said keyboard controller, and which if said power cut-off signal is generated by said power management system, cuts off said external power, outputs a power supplying condition signal indicating that power is cut-off to said main board and instead supplies said DC voltage from said data backup power unit only to said keyboard controller, and which if said WAKE-UP signal is generated by said power management system, cuts off power supplying of said data backup power unit and resumes power supply to said main board in accordance with said converted external power.

2. The system as defined in claim 1, wherein:

said power supplying unit, if said hibernation signal is generated by said power management system, cuts off power to said main board, supplies either said external power converted to said DC voltage by said switching mode power supply or said DC voltage output from said data backup power unit in accordance with said power cut-off signal, and outputs said power supplying condition signal; and said power management system reads the level of said power supplying condition signal more than one time, and determines that a hibernation function is successfully performed if the level of said power supplying condition signal remains the same after generating said hibernation signal.

3. The resume system as defined in claim 1, wherein said peripheral device is a modem that outputs a data receiving/transmitting signal said power management system generating said WAKE-UP signal in response to said data receiving/transmitting signal from said modem during a hibernation state.

4. A resume system for a computer, comprising:

a keyboard controller that processes user input via a keyboard or mouse;

a power supplying unit including:
a switching mode power supply for converting an AC voltage to a DC voltage, and
a backup power unit for supplying said DC voltage in case said AC voltage is not supplied; and a mother board including:
a system unit including a CPU and RAM of said computer,
a power management unit,
a keyboard port,
a keyboard power terminal, and
a system power terminal, wherein said keyboard controller and said power management unit are constructed to receive power from said keyboard port of said mother board while said system unit is constructed to receive power from said system power terminal, said power supplying unit supplying power to said keyboard power terminal and said system power terminal in a normal state of said computer and only to said keyboard power terminal in a hibernation state of said computer, so that power is only supplied to said power management unit and said keyboard controller, said power management unit controlling said normal state and said hibernation state in accordance with said user input via said keyboard controller.

5. A method for controlling a combined hibernation, and back-up power supply system for a computer comprising the steps of:

determining if a hibernation interrupt is generated in said computer in accordance with a lack of input from a peripheral device or a keyboard controller of said computer within a predetermined time:

outputting a signal to initiate a hibernation state of said computer if said hibernation interrupt is generated and to cut-off power supplied to a main board of said computer while maintaining power supplied to said keyboard controller from a data backup power unit;

determining if a hibernation function is successfully performed by verifying the level of a power supplying condition signal which is output by a power supplying unit that cuts off power to said main board in response to said signal initiating said hibernation state;

resuming power supply to said main board by outputting a wake-up signal when input from said peripheral device or said keyboard controller is generated; and preventing initiation of said hibernation state if said power supplying condition signal indicates that power supply to said main board was not cut off by said power supplying unit.

6. The method as defined in claim 5, further comprising:

cutting off power supplied to said main board by a switching mode power unit in response to a power cut-off signal received by said power supplying unit;

supplying either an external power converted into DC by said switching mode power unit or a DC voltage supplied from said data backup power unit only to a power management system and said keyboard controller in accordance with said power cut-off signal; and outputting said power supplying condition signal in correspondence with cutting off power to said main board.

7. The method as defined in claim 5, wherein said step for determining whether said hibernation function is successfully performed includes:

outputting said signal to initiate said hibernation state from a power management system;

sensing said power supplying condition signal outputted from said power supplying unit;

sensing the power supplying condition signal again after a predetermined delay if said power supplying condition signal indicates that power is cut-off to said main board according to performing said hibernation function; and determining that said hibernation function is successfully performed if said power supplying condition signal continues to indicate that power is cut-off according to said hibernation function.

* * * * *